(12) United States Patent
Barbosa

(10) Patent No.: US 9,238,212 B2
(45) Date of Patent: *Jan. 19, 2016

(54) PROCESS AND APPARATUS FOR TREATING A GAS STREAM

(71) Applicant: Mallinckrodt LLC, Hazelwood, MO (US)

(72) Inventor: Luis Barbosa, Hazelwood, MO (US)

(73) Assignee: MALLINCKRODT LLC, Hazelwood, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/316,149

(22) Filed: Jun. 26, 2014

(65) Prior Publication Data

US 2014/0308029 A1    Oct. 16, 2014

Related U.S. Application Data

(63) Continuation of application No. 13/978,725, filed as application No. PCT/US2012/020906 on Jan. 11, 2012, now Pat. No. 8,790,606.

(30) Foreign Application Priority Data

Jan. 12, 2011 (GB) .................. 1100504.8

(51) Int. Cl.
*B01J 8/00* (2006.01)
*B01J 8/02* (2006.01)
(Continued)

(52) U.S. Cl.
CPC .............. *B01J 10/00* (2013.01); *B01D 53/46* (2013.01); *C01B 3/08* (2013.01); *C01B 5/00* (2013.01); *G21C 9/00* (2013.01); *G21C 9/06* (2013.01);
(Continued)

(58) Field of Classification Search
CPC .............. B01J 8/00; B01J 8/02; B01J 8/0285; B01J 19/00; C01B 5/00; G21C 9/06
USPC .............................................. 423/248, 580.1
See application file for complete search history.

(56) References Cited

U.S. PATENT DOCUMENTS 2,863,729 A * 12/1958 McDuffie et al. .......... 423/580.1
3,630,956 A    12/1971 Benning
(Continued)

FOREIGN PATENT DOCUMENTS

EP    0170796 B1    2/1986
EP    0469260 A1 *  2/1992    ............... B01J 23/86
(Continued)

OTHER PUBLICATIONS

Sameh, "Production Techniques of Fission Molybdenum-99", Radiochimica Acta 41, 1987, pp. 65-72.
(Continued)

*Primary Examiner* — Timothy Vanoy

(57) ABSTRACT

A process of treating hydrogen gas liberated from the acid or alkaline dissolution of a metal is provided. The process comprises a step of passing the liberated hydrogen gas through a reactor containing an oxidizing agent for oxidation of the hydrogen gas into water, followed by a step of regenerating the oxidizing agent. Also provided is an apparatus for carrying out the process, the apparatus comprising a reactor containing the oxidizing agent, wherein the reactor is at least partially immersed in an alumina bath.

Figure 1:
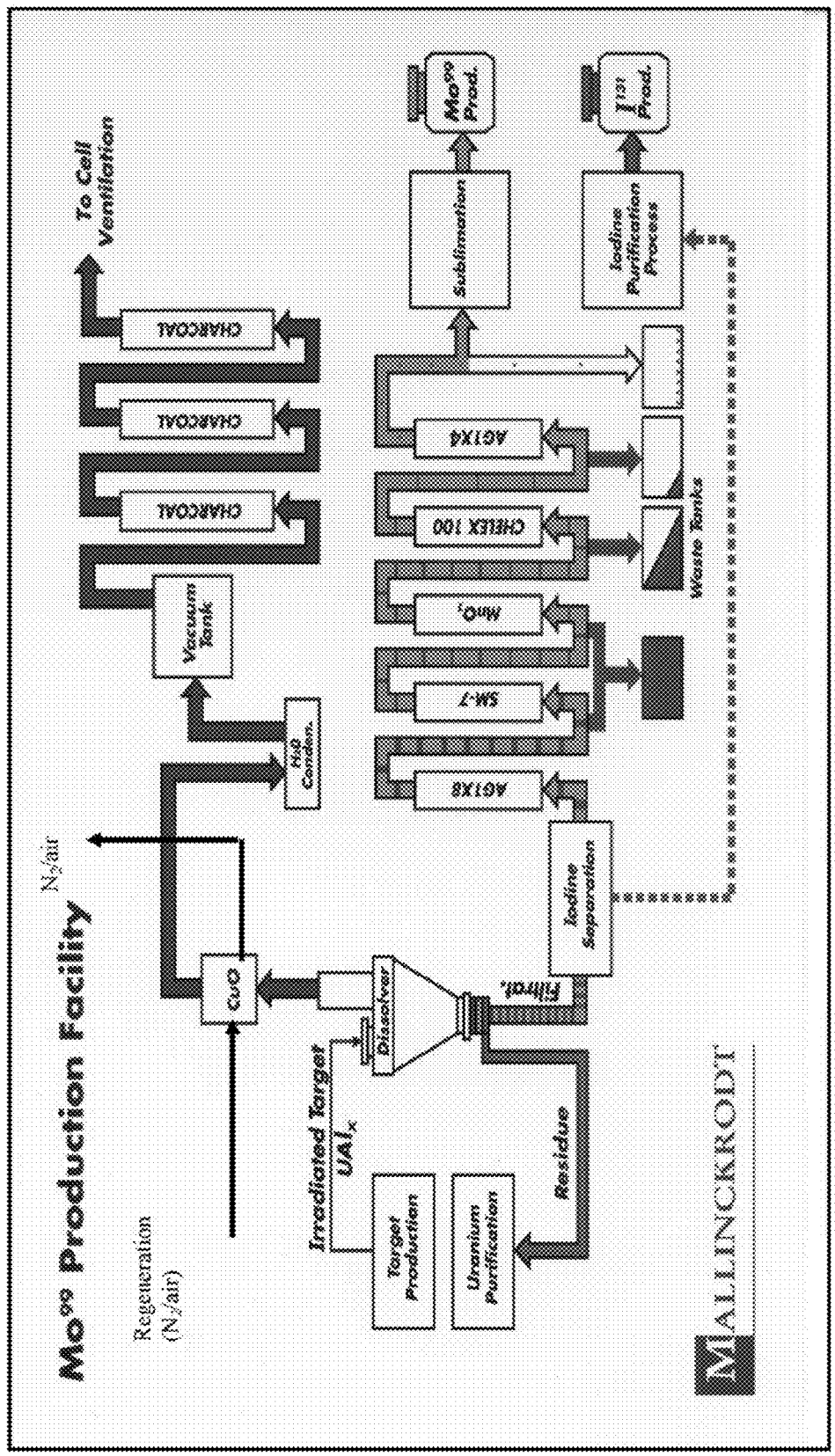

60 Claims, 3 Drawing Sheets
(3 of 3 Drawing Sheet(s) Filed in Color)

(51) Int. Cl.
  *B01J 19/00* (2006.01)
  *C01B 5/00* (2006.01)
  *G21C 9/06* (2006.01)
  *B01J 10/00* (2006.01)
  *C01B 3/08* (2006.01)
  *G21C 19/46* (2006.01)
  *G21G 1/00* (2006.01)
  *B01D 53/46* (2006.01)
  *G21C 9/00* (2006.01)

(52) U.S. Cl.
  CPC ............... *G21C 19/46* (2013.01); *G21G 1/001* (2013.01); *G21G 2001/0036* (2013.01); *Y02E 60/36* (2013.01); *Y02W 30/883* (2015.05)

(56) References Cited

U.S. PATENT DOCUMENTS

| | | | |
|---|---|---|---|
| 3,798,178 A * | 3/1974 | Soderquist et al. | 502/174 |
| 3,937,796 A | 2/1976 | Bhan | |
| 4,407,774 A * | 10/1983 | Schretzmann et al. | 376/300 |
| 4,696,768 A | 9/1987 | Ali et al. | |
| 5,087,410 A | 2/1992 | Kolditz | |
| 5,499,279 A | 3/1996 | Chakraborty | |
| 6,855,241 B2 | 2/2005 | Palmer | |
| 7,455,818 B2 | 11/2008 | Hill | |
| 8,790,606 B2 * | 7/2014 | Barbosa | 423/248 |
| 2003/0193988 A1 | 10/2003 | Bates | |
| 2003/0196911 A1 | 10/2003 | Palmer | |
| 2005/0220689 A1 | 10/2005 | Hill | |

FOREIGN PATENT DOCUMENTS

| | | | |
|---|---|---|---|
| EP | 0670575 B1 | 9/1995 | |
| EP | 1674424 A1 | 6/2006 | |
| GB | 1158861 | 7/1969 | |
| WO | WO 90/04748 A1 * | 5/1990 | ............... C01B 5/00 |
| WO | 2012/097045 A1 | 7/2012 | |

OTHER PUBLICATIONS

Van Der Walt, "The isolation of 99Mo from fission material for use in the 99mo/99mTc generator for medical use", Radiochimica Acta 2004, 92, pp. 251-257.

IAEA International Atomic Energy Agency, "Management of radioactive waste from 99Mo production", IAEA-TECDOC-1051, Nov. 1998.

Office action dated Dec. 11, 2013 from related U.S. Appl. No. 13/978,725, 7 pgs.

International Search Report and Written Opinion dated Apr. 13, 2012 from related International Application No. PCT/US2012/020906, 10 pgs.

Office action dated Apr. 21, 2015 from related Australian application No. 2012205625, 3 pgs.

* cited by examiner

PROCESS AND APPARATUS FOR TREATING A GAS STREAM

This patent application is a continuation of U.S. patent application Ser. No. 13/978,725, filed on Jul. 9, 2013, now U.S. Pat. No. 8,790,606, which is a U.S. National Stage of PCT/US2012/020906, filed Jan. 11, 2012, which claims priority to UK Patent Application No. 1100504.6, filed Jan. 12, 2011, each of which is incorporated herein in its entirety.

This invention relates to a process. In particular, it relates to a process for treating hydrogen gas liberated from the acid or alkaline dissolution of a metal. It also relates to a heating apparatus.

Acid or alkaline dissolution of a metal liberates hydrogen gas. At standard temperature and pressure, hydrogen gas is a colourless, odourless, tasteless and highly combustible diatomic gas. It reacts with any oxidizing agent. Hydrogen gas reacts vigorously with oxygen to produce water in a highly exothermic reaction. It also reacts spontaneously and violently at room temperature with chlorine and fluorine to form the corresponding hydrogen halides, which are potentially dangerous acids. The highly flammable and explosive properties of hydrogen gas make it a hazardous by-product in many processes.

Technetium-99m is the most widely used radiometal for medical diagnostic and therapeutic applications. Tc-99m is prepared by decay of Mo-99 in so-called Tc-99m generators. Such a generator typically comprises an aqueous solution of Mo-99 loaded onto an adsorbent (usually alumina). Following decay of the Mo-99 to Tc-99m, which has a lower affinity for the alumina, the Tc-99m may be eluted, typically using a saline solution. For the preparation of Tc-99m generators, a high purity source of Mo-99 is therefore essential.

In order to obtain Mo-99 of high specific activity, it is commonly prepared by the neutron-induced fission of a U-235 target. U-235 is typically present in a target form of U-metal foil, or constructs of U and Al (e.g., a uranium-aluminium alloy). The fission reaction leads to a proportion of the U-235 being converted to Mo-99, but also leads to a number of impurities in the reactor output. Most known processes for Mo-99 production employ acid or alkaline dissolution of the irradiated target, followed by purification of the Mo-99 product. Apart from the solid and liquid impurities, which include Cs, Sr, Ru, Zr, Te, Ba, Al and alkaline and alkaline earth metals, the reaction also produces hydrogen gas. Due to the highly inflammable and explosive properties of hydrogen gas, one of the most important off-gas treatments in the Mo-99 production process is the oxidation of hydrogen gas to form water.

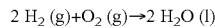

$$2\,H_2\,(g) + O_2\,(g) \rightarrow 2\,H_2O\,(l)$$

In most known Mo-99 production processes, the oxidation of hydrogen gas is carried out in the presence of copper (II) oxide (CuO) in the following irreversible reaction:

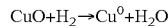

$$CuO + H_2 \rightarrow Cu^0 + H_2O$$

This process, first developed by Sameh and Ache in 1987 (Sameh and Ache, 1987 *Radiochim. Acta* 41,65), is performed in a so-called "CuO oven", which is a fixed-bed chemical reactor. After the dissolution of the irradiated targets, the evolved hydrogen is passed over hot CuO in the CuO oven to oxidise the hydrogen to water. The water vapour is then condensed. This reaction is a typical gas/solid reaction, during which the reaction front moves through the reactor until all CuO is consumed.

A typical CuO reactor bed weighs significantly more than 10 kg and runs at a temperature range of 360-400° C. (targeting a reaction temperature of 385° C.). The heating of the CuO bed is conventionally done by means of a heating plate, located beneath the CuO oven. It is not optimal, taking 24 hours to reach steady state conditions.

The CuO reactor bed is projected to be completely spent after the dissolution of a certain number of targets (or number of production runs). In a larger Mo-99 production facility, e.g., which enables the processing of more than 6 targets per run, the life time of this CuO reactor is reduced to a smaller number of runs, for example 8 runs.

Therefore, there is a need for the development of a reactor with a prolonged life time for the treatment of hydrogen gas.

US2005/0220689 A1 discloses a method of purifying helium gas by extracting hydrogen and other impurities from a helium gas stream. The method comprises 1) passing the gas stream over a first catalytic adsorber module containing a Cu—CuO mixture, in which hydrogen and carbon monoxide are oxidised into water and carbon dioxide, respectively, and CuO is reduced to Cu, 2) passing the gas stream resulting from step 1), along with oxygen gas, into an oxidation catalyst to convert methane and/or tritium into carbon dioxide and/or water, respectively, and 3) passing the gas stream resulting from step 2), which contains excess oxygen, into a second catalytic adsorber module containing a Cu—CuO mixture, in which the oxygen gas is used to oxidise Cu into CuO. Once the CuO in the first catalytic adsorber is consumed, the order in which the first and the second catalytic adsorbers are connected in the flow path of the gas stream is switched round such that the CuO generated in the second adsorber is used for the oxidation of hydrogen and carbon monoxide, and the Cu in the first adsorber is used to remove the excess oxygen from the purified helium gas stream.

However, this process relates to extraction of hydrogen from a gas stream comprising a number of other components and requires the use of two separate reactors containing Cu—CuO mixtures, which adds to the cost of the process. In addition, similar to hydrogen (i.e., $^1H$) gas, tritium is a highly explosive gas. The addition of oxygen to a gas stream containing tritium can potentially be hazardous. Therefore, there is a need for the development of a simple method for the treatment of hydrogen using an oxidising agent, during which the oxidising agent is regenerated so as to prolong the use thereof.

In accordance with a first aspect of the present invention, there is provided a process of treating hydrogen gas liberated from the acid or alkaline dissolution of a metal, the process comprising a step of passing the liberated hydrogen gas through a reactor containing an oxidising agent for oxidation of the hydrogen gas into water, followed by a step of regenerating the oxidising agent.

In a preferred embodiment, a step of regenerating the oxidising agent is carried out after each oxidation step. By carrying out a step of regenerating the oxidising agent frequently, such as after each oxidation step, the amount of the oxidising agent initially contained in the reactor can be reduced. Accordingly, the reactor can be scaled down, for example, to around 11 or 12 kg for oxidising the same amount of hydrogen gas. The reduction in the size of the reactor not only allows an easier handling charge/discharge operation but also reduces the time for the reactor to heat up or reach steady state conditions from presently 24 hours to about 3 hours, thereby reducing the cost of the process.

A further advantage of the process according to the present invention is that the oxidation reaction of hydrogen gas can potentially be conducted at lower temperatures, such as at around 200° C., with regeneration also at around 200° C. This is particularly the case when a finely dispersed oxidising agent, such as the BASF catalyst materials mentioned herein, is used. Such finely dispersed systems are more active than those used in known processes. The oxidation reaction used for the regeneration of the oxidising agent is, in certain embodiments, highly exothermic. Therefore, the heat given off from the regeneration reaction can be used to heat or maintain the temperature of the reactor. This further reduces the cost of the process.

In some embodiments, the oxidising agent is a metal oxide, such as copper oxide, such as copper (II) oxide, which is converted to copper metal during the process.

The copper oxide, such as copper (II) oxide, is present either in a bulk form or finely dispersed on the surface of an inert support, such as in the Puristar® R3-11G and R3-17 catalysts from BASF (BASF SE, Ludwigshafen, Germany). In addition, the oxidising agent, such as copper oxide, may be diluted (either in bulk form or in a finely dispersed form) with an inert, thermally-conductive diluent, such as stainless steel pellets. The diluent helps to prevent uncontrolled heating of the bed of oxidising agent as a result of the heat given out by the exothermic reaction.

A further advantage of using the finely dispersed oxidising agents, such as the BASF materials mentioned above, is that higher yields are achieved during the regeneration process than with bulk metal oxide (e.g., CuO) material.

In certain embodiments, the step of regenerating the oxidising agent comprises passing a gas containing oxygen through the reactor containing the oxidising agent to be regenerated. For example, air or air in combination with nitrogen gas can be used.

Since the gas containing oxygen used for the regeneration step is not mixed with the hydrogen gas, the present invention ensures that potential hazards caused by the highly explosive nature of the hydrogen gas are kept to a minimum.

In some embodiments, the metal, the dissolution of which liberates the hydrogen gas, comprises uranium, optionally in combination with one or more other metals, for example a uranium-aluminium alloy.

In some embodiments, the reactor containing the oxidising agent is at least partially immersed in an alumina bath. Optionally, the reactor is completely immersed in an alumina bath.

The term "alumina bath" refers to a vessel containing a quantity of alumina ($Al_2O_3$), which may be used as a means for regulating the temperature of a reactor immersed therein. The bath may take the form of a substantially cylindrical or cuboidal container. The outer walls of the bath are preferably formed of metal, e.g., stainless steel or aluminium. The alumina may form a lining within the container and define a cavity into which a reactor may be placed.

In a particular embodiment, the alumina bath is supplied with one or more optionally external heating elements. The relatively high thermal conductivity of alumina allows heat from the heating elements to be efficiently passed to a reactor immersed in the bath. Equally, during the highly exothermic process of the $H_2$ conversion and reactor regeneration steps, the alumina helps to conduct heat away from the reactor, thereby preventing it from overheating.

Whether or not an alumina bath is employed as described above, the reactor may also (or alternatively) be heated by means of one or more heating elements positioned in contact with the reactor. The heating elements (those in contact with the reactor, or those associated with the alumina bath) may conveniently be electrical heating elements.

In accordance with a second aspect of the present invention, there is provided an apparatus for carrying out a process according to the first aspect, the apparatus comprising a reactor containing an oxidising agent for the oxidation of hydrogen gas into water, wherein the reactor is at least partially immersed in an alumina bath.

In a preferred embodiment, the alumina bath is supplied with one or more heating elements. The heating elements are preferably external to the alumina bath.

In some embodiments, the oxidising agent is copper oxide, such as copper (II) oxide, either in a bulk form or finely dispersed on the surface of an inert support, such as in the Puristar® R3-11G and R3-17 catalysts from BASF. The oxidising agent may be diluted (either in bulk form or in a finely dispersed form) with an inert, thermally-conductive diluent, such as stainless steel pellets.

In accordance with a third aspect of the present invention, there is provided a heating apparatus comprising an alumina bath supplied with one or more optionally external heating elements, wherein the alumina bath defines a cavity into which a vessel to be heated may be placed in use.

In accordance with a fourth aspect of the present invention, there is provided a process of treating hydrogen gas liberated from the acid or alkaline dissolution of a metal, the process comprising a step of passing the liberated hydrogen gas through a reactor containing an oxidising agent for oxidation of the hydrogen gas into water, the oxidising agent comprising a metal oxide finely dispersed on an inert carrier and/or diluted with an inert, thermally-conductive diluent.

In a preferred embodiment, the metal oxide comprises copper oxide, such as copper (II) oxide. More preferably, the copper oxide finely dispersed on an inert carrier comprises the Puristar® R3-11G and/or R3-17 catalysts from BASF. The inert diluent may comprise stainless steel pellets.

As mentioned above, the use of a finely dispersed oxidising agent, such as the specified BASF materials, gives the advantage that a lower temperature (around 200° C.) can be used for the oxidation reaction. While R3-11 is known to be usable at temperatures of 200° C. or more, R3-17 is indicated by the manufacturer for use (in different applications) at temperatures not exceeding 100° C. It has been found that R3-17 is capable of use in the processes of the present invention at around 200° C. with no deleterious effects to the material.

In some embodiments, the process further comprises a step of regenerating the oxidising agent in accordance with the first aspect of the present invention.

A further advantage of using the finely dispersed oxidising agents is that higher yields are achieved during the regeneration process than with bulk metal oxide (e.g., CuO) material.

The invention will now be described in more detail by way of example only, and with reference to the following figures.

The patent or application file contains at least one drawing executed in color. Copies of this patent or patent application publication with color drawing(s) will be provided by the Office upon request and payment of the necessary fee.

Figure 2:
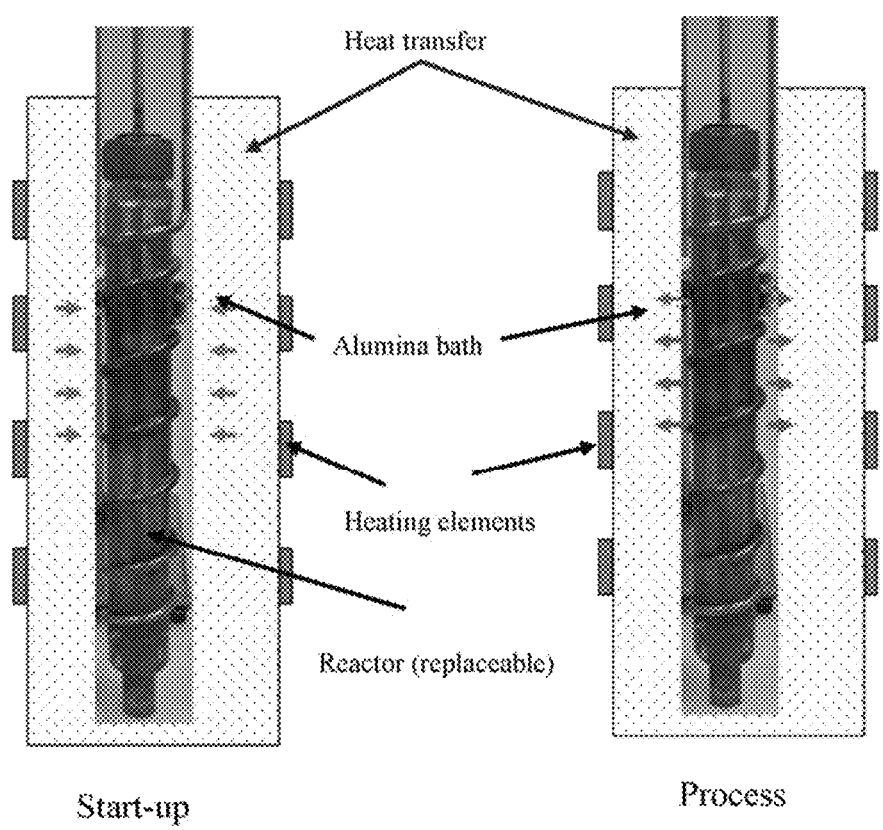
Figure 3:
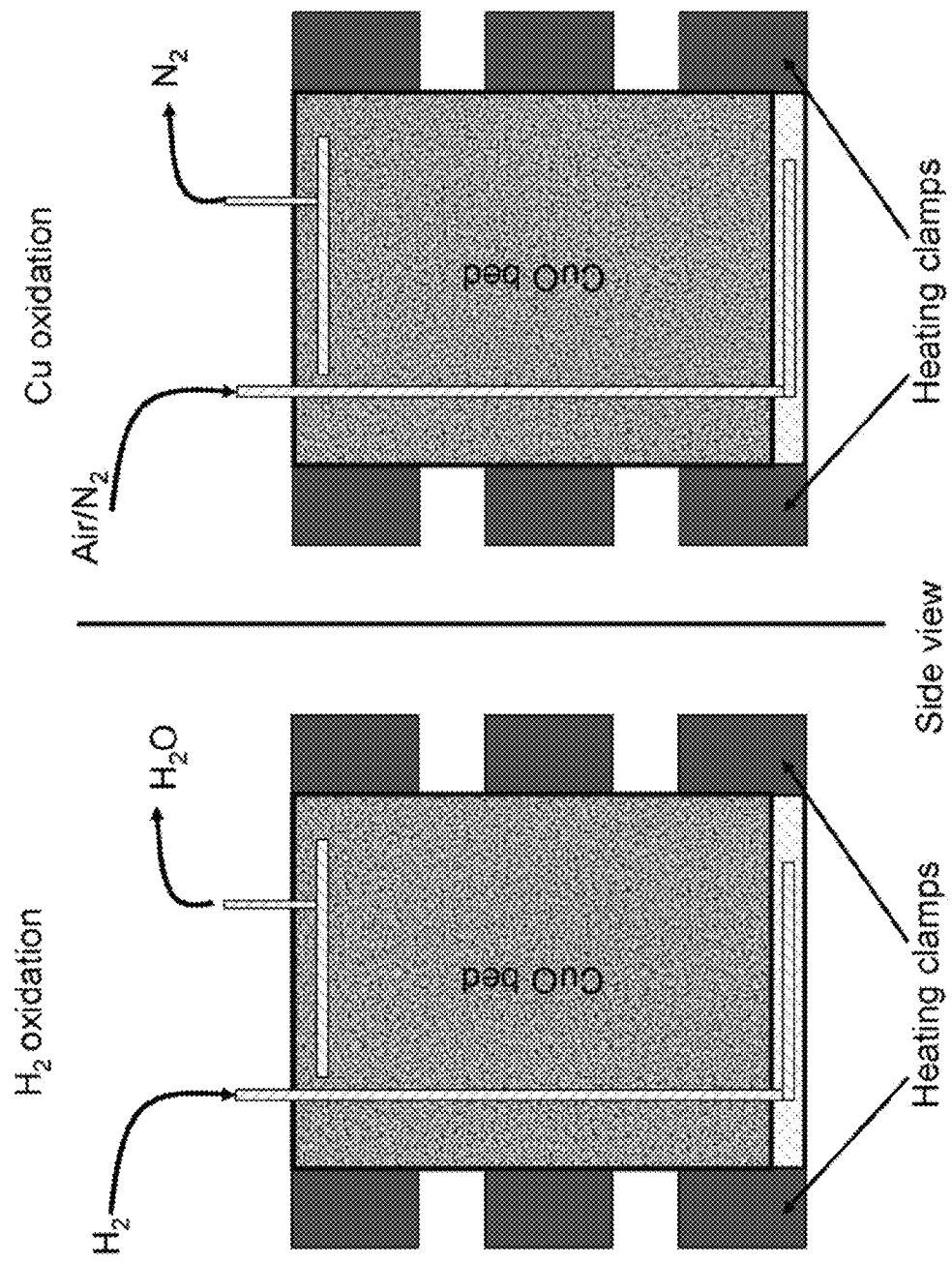

FIG. 1 shows a schematic diagram of an exemplary process of the invention, employed during Mo-99 production;

FIG. 2 shows a schematic diagram of the heat transfer between an alumina bath heating apparatus and a reactor containing an oxidising agent for the oxidation of hydrogen gas into water; and FIG. 3 shows a schematic, cross-sectional diagram of an apparatus for carrying out a process according to the invention, in which the reactor vessel containing the oxidising agent (in this case, CuO) is heated directly by means of electrically-heated clamps/bands.

As shown in FIG. 1, following the dissolution of an irradiated uranium-aluminium target, the hydrogen gas liberated in the dissolver is passed into a CuO reactor, in which the hydrogen gas is oxidised into water while the CuO is converted into Cu. After each oxidation step (and before the next round of oxidation begins), a stream of air-containing nitrogen gas ($N_2$/air) is fed into the CuO reactor to oxidise Cu in order to regenerate CuO.

The CuO reactor can be heated using a heating apparatus of the present invention as shown in FIG. 2. Such a heating apparatus can improve heat transfer during the operation of the reactor. The CuO reactor can be immersed in an alumina bath fitted with one or more external heating elements (see FIG. 2). The heating elements may be present as one or more collars or jackets around the bath, or as a heating coil. The heating elements are preferably electrically heated. The alumina bath works as a heat exchanger. Firstly, the bath heats up the reactor to the desired reaction temperature (see "Start-up" in FIG. 2). Since the $H_2$ conversion and Cu oxidation reactions are highly exothermic, however, the bath also works as a cooler during these processes (charge exhaustion and regeneration), preventing the reactor from overheating (see "Process" in FIG. 2). When the $H_2$ conversion reaction is still taking place, but not sufficiently to heat up the reactor to its optimal working temperature, the bath resumes its heating function to keep the temperature of the reactor in the desired range (see "Start-up" in FIG. 2).

As an alternative to the use of an alumina bath as shown in FIG. 2, it is possible to hear the reactor directly using one or more heated clamps or bands positioned in contact with the reactor. FIG. 3 shows such an arrangement, with three heating bands displayed for illustrative purposes. It will be appreciated that the bands may be in the form of a single helical band which runs along at least part of the length of the reactor. In the left part of FIG. 3 ($H_2$ oxidation), $H_2$ gas from the dissolution of a metal is introduced via a first conduit which passes the gas to the bottom of the reactor (as shown). The gas passes through the bed of CuO, and reacts therewith leading to the production of gaseous water. The gaseous water exits through a venting conduit positioned towards the top of the reactor (as shown). In the right part of the Figure (Cu oxidation), a mixture of air and nitrogen is introduced through the first conduit. The oxygen in the air reacts with the partially- or fully-spent CuO bed, so as to reoxidise the Cu present therein. The waste nitrogen gas exits the reactor through the venting conduit.

A number of cycles of $H_2$ conversion and oxidant regeneration were performed using a process according to the invention. The cycles were performed using solid aluminium 'targets' as the metal for dissolution. Twenty cycles were performed, with the dissolution of a total amount of Al equivalent to more than 200 U—Al targets. The experimental set-up mimicked the current process line in a Mo-99 production facility. In each cycle, the number of Al 'targets' dissolved was equivalent to the maximum amount of targets allowed in the production facility employed.

The initial temperature of the CuO reactor was 200° C. The maximum temperature in the CuO reactor during the conversion and regeneration reactions was within limits which are considered acceptable in current processes for $H_2$ removal. The reactor was heated directly using heating elements in the form of bands surrounding the reactor. The amount of CuO material was around 11 kg. In addition, the lower 1.5 kg part of the CuO bed was diluted 50% by weight with stainless steel pellets The average $H_2$ conversion during the 20 cycles was >95%. During the regeneration phase of the cycles, the average CuO bed regeneration was >90%.

What is claimed is:

1. A heating apparatus comprising an alumina bath supplied with one or more external heating elements, wherein the alumina bath defines a cavity into which a reactor may be placed, the reactor comprising an oxidising agent for the oxidation of hydrogen gas into water.

2. The heating apparatus of claim 1, wherein the oxidising agent comprises copper oxide.

3. The apparatus of claim 2, wherein the oxidising agent is diluted with an inert diluent.

4. The heating apparatus of claim 3, wherein the oxidising agent is diluted 50% by weight with the inert diluent.

5. The heating apparatus of claim 2, wherein hydrogen gas is passed into the CuO reactor in which the hydrogen gas is oxidised into water while the CuO is converted into Cu.

6. The heating apparatus of claim 5, wherein a stream of air-containing nitrogen gas (N2/air) is fed into the CuO reactor to oxidise Cu in order to regenerate CuO.

7. The heating apparatus of claim 2, wherein the oxidising agent is selected from R3-11G and R3-17 catalysts.

8. The heating apparatus of claim 1, wherein the reactor is at least partially immersed in the alumina bath.

9. The heating apparatus of claim 8, wherein the reactor is completely immersed in the alumina bath.

10. The heating apparatus of claim 1, wherein the one or more external heating elements is selected from a collar, a jacket, and a heating coil.

11. The heating apparatus of claim 1, wherein the external heating elements are electrically heated.

12. The hearing apparatus of claim 1, wherein the alumina bath is a heat exchanger.

13. The heating apparatus of claim 1, wherein the alumina bath heats up the reactor to an initial reaction temperature with no deleterious effects to the oxidising agent material.

14. The heating apparatus of claim 13, wherein the initial reaction temperature is 200° C.

15. The heating apparatus of claim 1, wherein the alumina bath comprises outer walls taking the form of a substantially cylindrical or cuboidal container.

16. The heating apparatus of claim 15, wherein the outer walls of the alumina bath comprise stainless steel or aluminum.

17. The heating apparatus of claim 1, wherein the reactor comprises less than 12 kg of the oxidising agent.

18. An apparatus for treating hydrogen gas liberated from the acid or alkaline dissolution of a metal, the apparatus comprising a reactor comprising an oxidising agent for the oxidation of hydrogen gas into water, wherein the reactor is heated with one or more heating elements positioned in contact with the reactor, wherein the liberated hydrogen gas is passed through the reactor followed by regeneration of the oxidising agent, and wherein the oxidising agent comprises a metal oxide in bulk form or a metal oxide finely dispersed on the surface of an inert support.

19. The apparatus of claim 18, wherein the one or more heating elements are selected from one or more heated clamps or bands.

20. The apparatus of claim 19, wherein the bands may be in the form of a single helical band which runs along at least part of a length of the reactor.

21. The apparatus of claim 18, wherein the heating elements are electrically heated.

22. The apparatus of claim 18, wherein the one or more heating elements heat up the reactor to an initial reaction temperature with no deleterious effects to the oxidising agent material.

23. The apparatus of claim 22, wherein the initial reaction temperature is 200° C.

24. The apparatus of claim 18, wherein the oxidising agent comprises copper oxide.

25. The apparatus of claim 24, wherein the oxidising agent is selected from R3-11G and R3-17 catalysts.

26. The apparatus of claim 18, wherein the oxidising agent is diluted with an inert diluent.

27. The apparatus of claim 26, wherein the inert diluent comprises stainless steel pellets.

28. The apparatus of claim 26, wherein the oxidising agent is diluted 50% by weight with the inert diluent.

29. The apparatus of claim 18, wherein the reactor further comprises a first conduit.

30. The apparatus of claim 29, wherein the liberated hydrogen gas enters the reactor through the first conduit.

31. The apparatus of claim 29, wherein a mixture of nitrogen and air is introduced to the reactor through the first conduit for the regeneration of the oxidising agent.

32. The apparatus of claim 18, wherein the reactor further comprises a venting conduit.

33. The apparatus of claim 32, wherein gaseous water exits the reactor through the venting conduit.

34. The apparatus of claim 32, wherein waste nitrogen gas exist the reactor through the venting conduit after the regeneration of the oxidising agent.

35. The apparatus of claim 18, wherein the reactor comprises less than 12 kg of the oxidising agent.

36. An apparatus for treating hydrogen gas liberated from the acid or alkaline dissolution of a metal, the apparatus comprising a reactor comprising an oxidising agent diluted with an inert diluent for the oxidation of hydrogen gas into water, wherein the reactor is at least partially immersed in an alumina bath supplied with one or more external heating elements, and wherein the liberated hydrogen gas is passed through the reactor followed by regeneration of the oxidizing agent.

37. The apparatus of claim 36, wherein the one or more heating elements are selected from a collar, a jacket, and a heating coil.

38. The apparatus of claim 36, wherein the heating elements are electrically heated.

39. The apparatus of claim 36, wherein the alumina bath heats up the reactor to an initial reaction temperature with no deleterious effects to the oxidising agent material.

40. The apparatus of claim 30, wherein the initial reaction temperature is 200° C.

41. The apparatus of claim 36, wherein the oxidising agent comprises copper oxide.

42. The apparatus of claim 41, wherein the oxidising agent is selected from R3-11G and R3-17 catalysts.

43. The apparatus of claim 36, wherein the oxidising agent is diluted with an inert diluent.

44. The apparatus of claim 43, wherein the inert diluent comprises stainless steel pellets.

45. The apparatus of claim 43, wherein the oxidising agent is diluted 50% by weight with the inert diluent.

46. The apparatus of claim 36, wherein the reactor further comprises a first conduit.

47. The apparatus of claim 46, wherein the liberated hydrogen gas enters the reactor through the first conduit.

48. The apparatus of claim 46, wherein a mixture of nitrogen and air is introduced to the reactor through the first conduit for the regeneration of the oxidising agent.

49. The apparatus of claim 36, wherein the reactor further comprises a venting conduit.

50. The apparatus of claim 49, wherein gaseous water exits the reactor through the venting conduit.

51. The apparatus of claim 49, wherein waste nitrogen gas exist the reactor through the venting conduit after the regeneration of the oxidising agent.

52. The apparatus of claim 36, wherein the reactor comprises less than 12 kg of the oxidising agent.

53. A process for treating hydrogen gas liberated from the acid or alkaline dissolution of a metal using the apparatus of claim 18, the process comprising passing the liberated hydrogen gas through the reactor and regenerating the oxidising agent.

54. The process of claim 53, wherein the oxidation of hydrogen gas into water is greater than 95%.

55. The process of claim 53, wherein the regeneration of the oxidising agent is greater than 90%.

56. The process of claim 53, wherein the reactor reaches steady state conditions in 3 hours.

57. A process for treating hydrogen gas liberated from the acid or alkaline dissolution of a metal using the apparatus of claim 36, the process comprising passing the liberated hydrogen gas through the reactor and regenerating the oxidising agent.

58. The process of claim 57, wherein the oxidation of hydrogen gas into water is greater than 95%.

59. The process of claim 57, wherein the regeneration of the oxidising agent is greater than 90%.

60. The process of claim 57, wherein the reactor reaches steady state conditions in 3 hours.

* * * * *